United States Patent [19]

Lee

[11] 4,227,416
[45] Oct. 14, 1980

[54] SPEED INDICATING APPARATUS FOR AUTOMOBILE

[76] Inventor: Jiunn-Feng Lee, 4th Fl., 103, Sec. 2, Wu-Chang St., Taipei, Taiwan

[21] Appl. No.: 42,120

[22] Filed: May 24, 1979

[51] Int. Cl.$^3$ .......................... G01P 3/50; G01P 1/11
[52] U.S. Cl. ..................................... 73/499; 200/56 R
[58] Field of Search ............... 73/499, 488; 200/56 R, 200/DIG. 32, 61.58 R; 335/206; 340/53, 62, 670; 116/62.1

[56] References Cited

U.S. PATENT DOCUMENTS

| | | | |
|---|---|---|---|
| 2,814,796 | 11/1957 | Kozel | 200/56 R |
| 2,887,679 | 5/1959 | Curva | 73/499 |
| 2,992,300 | 7/1961 | Zargarpur | 200/56 R |
| 3,258,554 | 6/1966 | Cloup | 200/56 R |
| 4,041,782 | 8/1977 | Hingst | 73/499 |
| 4,137,512 | 1/1979 | Sidor | 335/206 |

FOREIGN PATENT DOCUMENTS 572661  3/1959  Canada ........................................ 73/499

Primary Examiner—Gerald Goldberg
Assistant Examiner—Denis E. Corr

[57] ABSTRACT

A speed indicating apparatus for an automobile comprising a plurality of indicator lights showing the travelling speed at all times, a half-circular magnet pivoted on a hand shaft of a speedometer in the automobile, a plurality of contact metal plates connected to a lead wire of each said indicator light separately, and a ground connection circular metal plate connected to said hand shaft of said speedometer; said speed indicating apparatus being capable of giving indications of the travelling speed to other drivers at all times and reminding the driver of his speeding so as to minimize the traffic accidents.

4 Claims, 3 Drawing Figures

SPEED INDICATING APPARATUS FOR AUTOMOBILE

FIELD OF THE INVENTION

BACKGROUND OF THE INVENTION

This invention relates to a speed indicating apparatus to be mounted on the rear or the outer frame of an automobile comprising a plurality of indicator lights giving indications of the travelling speeds at all times so that other drivers may read the speed of the automobile from any appreciable distance by the different figures or colors of the indicator lights.

Much emphasis has been placed on safety in automobiles. The danger in driving an automobile or the like at a high speed is obvious. Despite the fact that every automobile is provided with a speedometer within the drivers vision, the travelling speed is unknown to other drivers and the driver is prone to neglecting his speeding.

The driver's view is weakened more or less after dark which causes an automobile crash to happen easily especially when a driver changes his driving speed suddenly.

SUMMARY OF THE INVENTION

It is, therefore, an important object of the present invention to provide a speed indicating apparatus for an automobile giving indications of the travelling speed to other drivers at all times.

Further object of the present invention is to provide in a vehicle a speed indicating apparatus including a plurality of lamps for giving signals to other drivers when the vehicle stops. Thus, the motorcar crash in the free way or highway may be minimized.

Still a further object of the present invention is to provide a speed indicating apparatus as set forth above further including an alarming means giving sound of warning so as to remind the driver of the fact that he is travelling at an illegal or dangerous speed.

Other objects, features and advantages of the invention will become apparent from the following description hereinafter set forth in reference to the accompanying drawings which illustrate a preferred embodiment of this invention.

SUMMARY DESCRIPTION OF THE DRAWINGS

DETAILED DESCRIPTION OF THE PREFERRED EMBODIMENT

Figure 1:
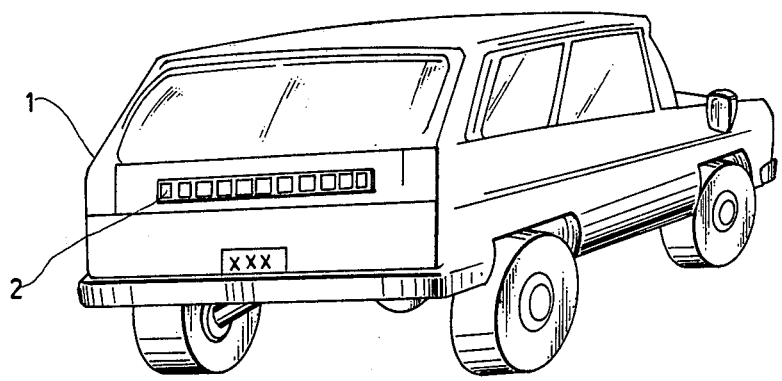
FIG. 1 is a perspective view of a common motor vehicle wherein a preferred speed indicating apparatus emboding the present invention is provided on the rear frame thereof.
Figure 2:
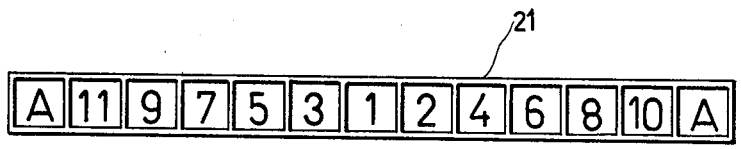
FIG. 2 is an enlarged front view of the indicator lights as illustrated in FIG. 1.

In accordance with this invention, a speed indicating apparatus 2 as shown in FIG. 1 is mounted in whole on the rear frame of an automobile 1. The speed indicating apparatus 2 comprises, a set of indicator lights 21 (best shown in FIG. 2) giving indications of the travelling speed of the automobile at all times by means of the figures, colors or the combination of both the figures and colors. Each of the indicator lights may, by way of example, be given on the outer surface a figure to indicate the speed by ten miles an hour. Two lamps "A" situated on both sides of the indicator lights will glow only when the travelling speed exceeds a certain degree; in addition, an alarming device (not shown) provided thereon will ring simultaneously so as to give sound of warning.

Figure 3:
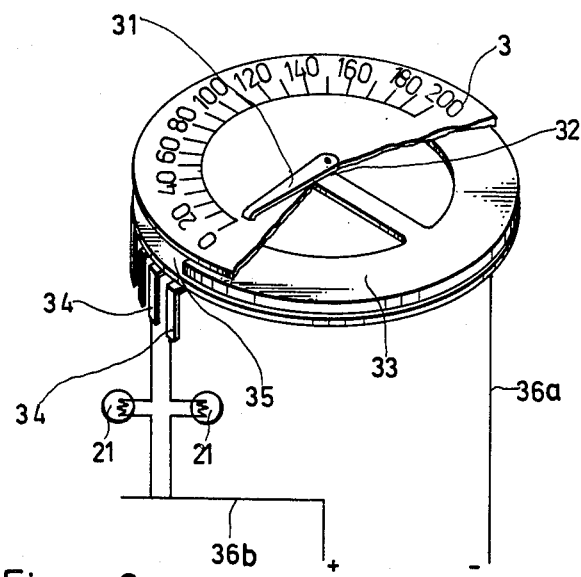
FIG. 3 is a schemmatical diagram illustrating the combination of the circuit of the speed indicator lights and a speedometer.

FIG. 3 shows the circuit diagram of the speed indicator lights according to this invention. When a speed hand 31 of a speedometer 3 in the automobile 1 moves in the clockwise direction to show the speed, one end of a half-circular magnet 33 pivoted on a shaft 32 of said speed hand 31 will move to the position where the speed hand 31 is. A plurality of contact metal plates 34 of certain elasticity situated below the speedometer 3 will in turn be attracted one by one to move upwards to come into contact with a ground connection circular plate 35 which is connected to the cathode of a battery in the automobile 1 (not shown) by a lead wire 36a. Furthermore, said contact metal plates 34 are connected to said indicator lights 21 by a plurality of lead wires 36b separately and a circuit is formed accordingly to light up the indicator lights 21. The said indicator lights 21 are connected in parallel with the contact metal plates 34 separately so that the indicator lights may be lit or extinguished one by one to give indications of the speed.

The number of the indicator lights will increase as the speed does. When the travelling speed exceeds a certain degree, the two alarming lamps "A" will glow and the alarming device connected in parallel with the indicator lights circuit will ring simultaneously so as to warn the driver or other drivers. It shall be understood that the indicator lights will be extinguished one by one in a reverse manner when the speed is being reduced.

While a specific preferred embodiment of this invention has been shown and described in detail to illustrate the application of the principles thereof, it should be understood that the invention may be otherwise embodied without departing from the scope and the spirit of this invention.

What I claim is:

1. A speed indicating apparatus for an automobile comprising a plurality of indicator lights, a half-circular magnet pivoted on a shaft of a speed hand of a speedometer in the automobile, a plurality of contact metal plates of certain elasticity situated below said speedometer and connected to a lead wire of each said indicator lights separately, and a ground connection circular metal plate pivoted on said shaft of said speedometer and connected to the cathode of an electrical source; said magnet following said shaft to rotate so as to attract said contact metal plates to come into contact with said ground connection circular metal plate, and the indicator lights glowing in turn so as to give indications of the travelling speed to other drivers at all times.

2. A speed indicating apparatus as set forth in claim 1 wherein each said contact metal plate is connected in parallel with each said indicator light circuit so that said indicator lights may be lit or extinguished one by one.

3. A speed indicating apparatus as set forth in claim 1 wherein said speed indicating apparatus further comprises one or more than one indicator lamps to serve as alarming lamps.

4. A speed indicating apparatus as set forth in claim 1 wherein source of electrical power comes from a battery in the automobile.

* * * * *